United States Patent
Shaw

(10) Patent No.: US 10,143,124 B2
(45) Date of Patent: Dec. 4, 2018

(54) LOCKING LINK ASSEMBLY FOR WORK MACHINE HITCH

(71) Applicant: AGCO Corporation, Duluth, GA (US)

(72) Inventor: Matthew Shaw, Jackson, MN (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 15/549,727

(22) PCT Filed: Feb. 17, 2016

(86) PCT No.: PCT/US2016/018281
§ 371 (c)(1),
(2) Date: Aug. 9, 2017

(87) PCT Pub. No.: WO2016/137799
PCT Pub. Date: Sep. 1, 2016

(65) Prior Publication Data
US 2018/0042166 A1 Feb. 15, 2018

Related U.S. Application Data

(60) Provisional application No. 62/119,920, filed on Feb. 24, 2015.

(51) Int. Cl.
*A01B 59/00* (2006.01)
*A01B 59/043* (2006.01)
*B60D 1/42* (2006.01)

(52) U.S. Cl.
CPC .............. *A01B 59/004* (2013.01); *B60D 1/42* (2013.01)

(58) Field of Classification Search
CPC ... A01B 59/004; A01B 59/041; A01B 59/068; A01B 59/0415; B60D 1/42; B60D 1/249;
(Continued)

(56) References Cited

U.S. PATENT DOCUMENTS 3,731,951 A * 5/1973 Gruenberger ........ A01B 59/004
172/439
4,194,757 A 3/1980 Lucas et al.
(Continued)

FOREIGN PATENT DOCUMENTS

DE 3938418 C1 3/1991
DE 102012211931 A1 1/2014
(Continued)

OTHER PUBLICATIONS

International Property Office, International Search Report for UK Application No. GB1504621.2, dated Aug. 21, 2015.
(Continued)

*Primary Examiner* — Robert E Pezzuto

(57) ABSTRACT

A locking mechanism for a link assembly of a work vehicle hitch has a locking plate mounted to an upper portion of the link assembly. A collar is positioned over the sleeve and is configured to slide relative a portion of the sleeve. The collar meshes with the sleeve so as to prevent rotational movement of the upper portion of the sleeve relative the collar when the collar is adjacent the upper portion, but the sleeve can rotate relative the collar when the collar is adjacent a middle portion of the sleeve. The locking mechanism has a handle mounted on the collar that is pivotable between a locked position where the handle is generally parallel with the sleeve in which the collar is prevented from sliding relative the sleeve and a released position generally perpendicular to the sleeve in which the collar is able to slide relative the sleeve.

4 Claims, 5 Drawing Sheets

(58) Field of Classification Search
CPC ........... B60D 1/141; B60D 1/155; F16C 7/06; F16G 11/12
USPC ............ 172/439, 447, 450, 679; 403/44, 46; 411/427
See application file for complete search history.

(56) References Cited

U.S. PATENT DOCUMENTS

| | | | |
|---|---|---|---|
| 4,418,935 A | 12/1983 | O'Connor | |
| 4,778,194 A | 10/1988 | Koch et al. | |
| 5,042,588 A * | 8/1991 | Herchenbach | A01B 59/004 172/439 |
| 5,076,369 A | 12/1991 | Herchenbach | |
| 5,697,454 A | 12/1997 | Wilcox et al. | |
| 5,765,957 A * | 6/1998 | Connell | F16C 7/06 403/44 |
| 6,056,069 A | 5/2000 | Hagen et al. | |
| 6,089,328 A * | 7/2000 | Moore | A01B 59/068 172/439 |
| 6,655,468 B2 | 12/2003 | Casali et al. | |
| 6,909,575 B2 | 6/2005 | Soyama et al. | |
| 7,048,071 B1 | 5/2006 | Huenink et al. | |
| 9,491,898 B2 * | 11/2016 | Laubner | A01B 59/004 |
| 2003/0159842 A1 * | 8/2003 | Casali | A01B 59/004 172/439 |

FOREIGN PATENT DOCUMENTS

| | | |
|---|---|---|
| GB | 2366507 A | 3/2002 |
| JP | H01 252204 A | 10/1989 |

OTHER PUBLICATIONS

European Patent Office, International Search Report for parent International Application No. PCT/US2016/018281, dated Aug. 11, 2016.

* cited by examiner

LOCKING LINK ASSEMBLY FOR WORK MACHINE HITCH

CROSS REFERENCE TO RELATED APPLICATION

This application claims the benefit of U.S. Provisional Application No. 62/119,920 filed Feb. 24, 2015, which is hereby incorporated by reference in its entirety.

BACKGROUND OF THE INVENTION

Field of Invention

This invention relates to a hitch for a work machine, and more particularly to an adjustable link assembly for a hitch.

Description of Related Art

A work machine, such as an agricultural tractor, typically includes a coupling arrangement (sometimes referred to as a 3-point hitch) for attaching a work implement to the work machine. The coupling arrangement generally includes a link assembly for connecting an arm and a bar which extend outwardly from the frame of the work machine.

The link assembly includes an internally threaded sleeve and an externally threaded rod positioned within the internally threaded sleeve. The externally threaded rod meshingly engages the internally threaded sleeve so that relative rotation between these two elements in a first direction causes the externally threaded rod to be advanced out of the internally threaded sleeve thereby increasing the length of the link assembly. In the alternative, relative rotation between these two elements in a second direction causes the externally threaded rod to be advanced further into the internally threaded sleeve thereby decreasing the length of the link assembly. Adjusting the length of the link assembly in the above described manner is important for ensuring that the work implement is appropriately attached to the work machine.

Various devices have been utilized to address the problem of the length of the link assembly inadvertently changing during the use of the work machine. In particular, vibrations generated during use of the work machine are communicated to the internally threaded sleeve and the externally threaded rod through various work machine structures. These vibrations can cause relative rotation between the internally threaded sleeve and the externally threaded rod. As a result, the length of the link assembly inadvertently changes during use of the work machine which can adversely affect the performance of a work function.

In an attempt to address the aforementioned problem, some coupling arrangements include a locking mechanism 46 for preventing the relative rotation between the internally threaded sleeve and the externally threaded rod. However, a drawback to these types of latches is that they utilize a removable hair pin, lynch pin or other keeper. One problem that occurs is the field is that these pins that keep adjustment handle 78s in place are often lost. The present invention is directed to overcoming one or more of the problems as set forth above

OVERVIEW OF THE INVENTION

In one embodiment, the invention is directed to a work machine having a coupling arrangement for a towed implement. The coupling arrangement has a pair of rocker arms and a pair of draft arms with a pair of link assemblies interposed between and secured to the rocker arms and draft arms. Each link assembly includes a sleeve having an internally threaded bore disposed therein and defining an axis A along its axial length and first and second rods. The first and second rods have externally threaded end portions and distal connection ends, the externally threaded end portions of the first and second rods being positioned within the bore to threadingly engage the internally threaded sleeve to permit a length of the link assembly to be altered by rotating the sleeve relative to the first and second rods. The link assembly also has a locking mechanism having a locking plate mounted to the upper portion of the link assembly such that the locking plate is prevented from rotating relative the upper portion of the link assembly. A collar is positioned over the sleeve and is configured to slide relative a portion of the sleeve along axis A. The collar meshes with an upper portion of the sleeve so as to prevent rotational movement of the upper portion of the sleeve relative the collar when the collar is adjacent the upper portion, but the sleeve can rotate relative the collar when the collar is adjacent a middle portion of the sleeve. The locking mechanism also has a locking handle mounted on the collar that is pivotable between a locked position in which the handle is generally parallel with the axis A of the sleeve in which the collar is prevented from sliding along axis A relative the sleeve and a released position generally perpendicular to the axis A in which the collar is able to slide relative the sleeve along axis A.

These and other features and advantages of this invention are described in, or are apparent from, the following detailed description of various exemplary embodiments of the systems and methods according to this invention.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein.

Corresponding reference characters indicate corresponding parts throughout the views of the drawings.

DETAILED DESCRIPTION OF EXEMPLARY EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Figure 1:
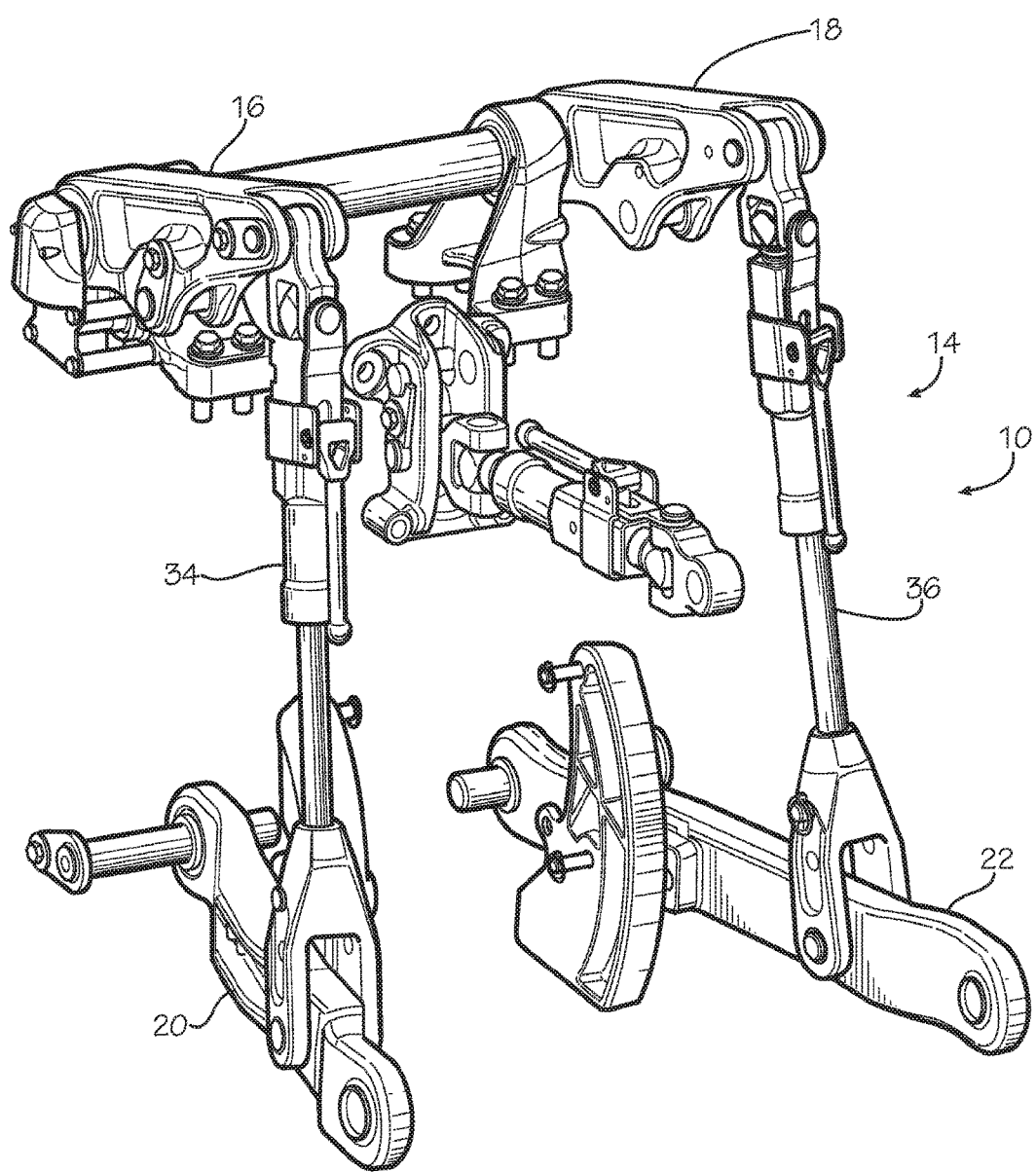
FIG. 1 is a perspective view of a hitch assembly embodying the present invention.

Referring now to FIG. 1, there is shown a portion of an exemplary work machine 10 which incorporates the features of the present invention therein. Work machine 10 includes a coupling arrangement 14 extending from frame a frame of the machine 10. Coupling arrangement 14 includes a pair of rocker arms 16 and 18 which are pivotally secured to the machine 10. Coupling arrangement 14 also includes a pair of draft arms 20 and 22 which are also pivotally secured to frame 12. Coupling arrangement 14 also includes a pair of hydraulic cylinders (not shown) with one end of the hydraulic cylinder being attached to rocker arm 16, while the other end of hydraulic cylinder is attached to the frame of machine 10. In a similar manner, the other hydraulic cylinder is attached to rocker arm 18. As would be understood by one or ordinary skill, the coupling arrangement 14 may connect to a three-point hitch having lower couplers and a top hook as is known in the art.

Coupling arrangement 14 also includes a pair of link assemblies 34 and 36. Link assembly 34 is interposed between and secured to rocker arm 16 and draft arm 20. In a similar fashion, link assembly 36 is interposed between and secured to rocker arm 18 and draft arm 22. It should be understood that link assembly 36 is structurally and functionally identical to link assembly 34. Therefore, while the following description is directed to link assembly 34, it should be understood that the description also applies to link assembly 36. As such, no further description will be given of link assembly 36.

As described above link assembly 34 is interposed between and connected to rocker arm 16 and draft arm 20. Having link assembly 34 attached in the above described manner allows an operator of work machine 10 to actuate hydraulic cylinder in a well-known manner and thus move rocker arm 16 and draft arm 20. Such movement may be required, for example, when coupling a work implement (not shown) to work machine 10.

Figure 2:
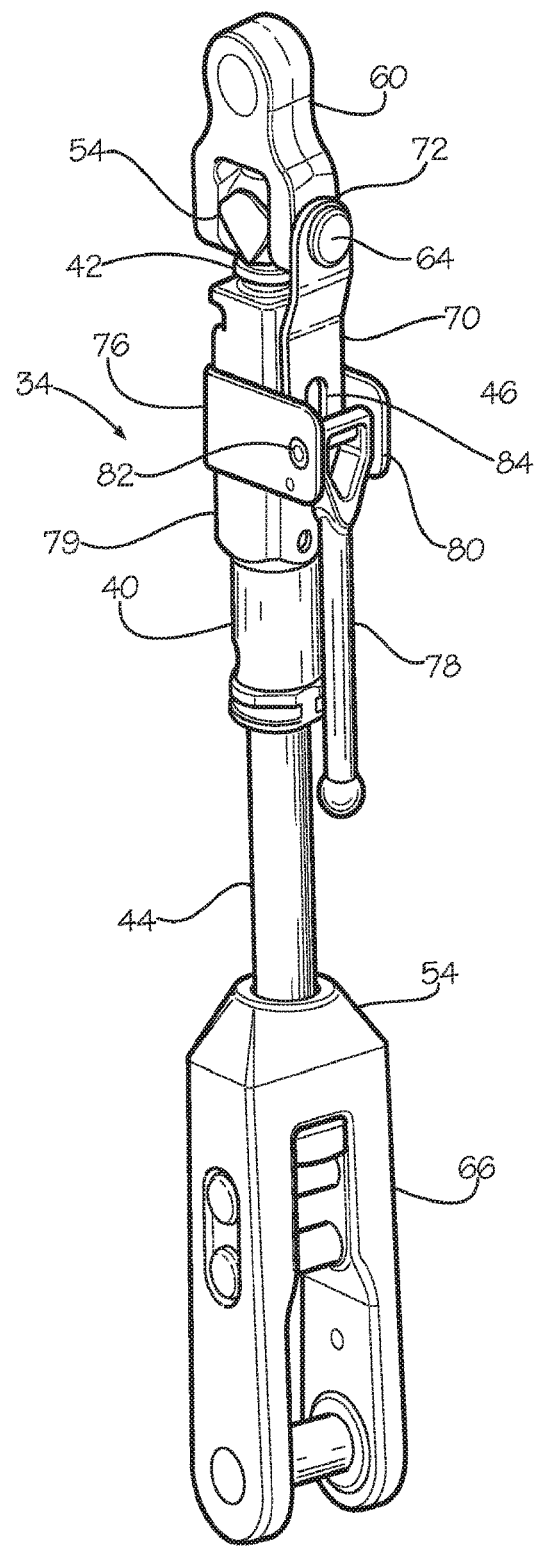
FIG. 2 is a perspective view of an adjustable link assembly of the present invention shown in an extended position.
Figure 3:
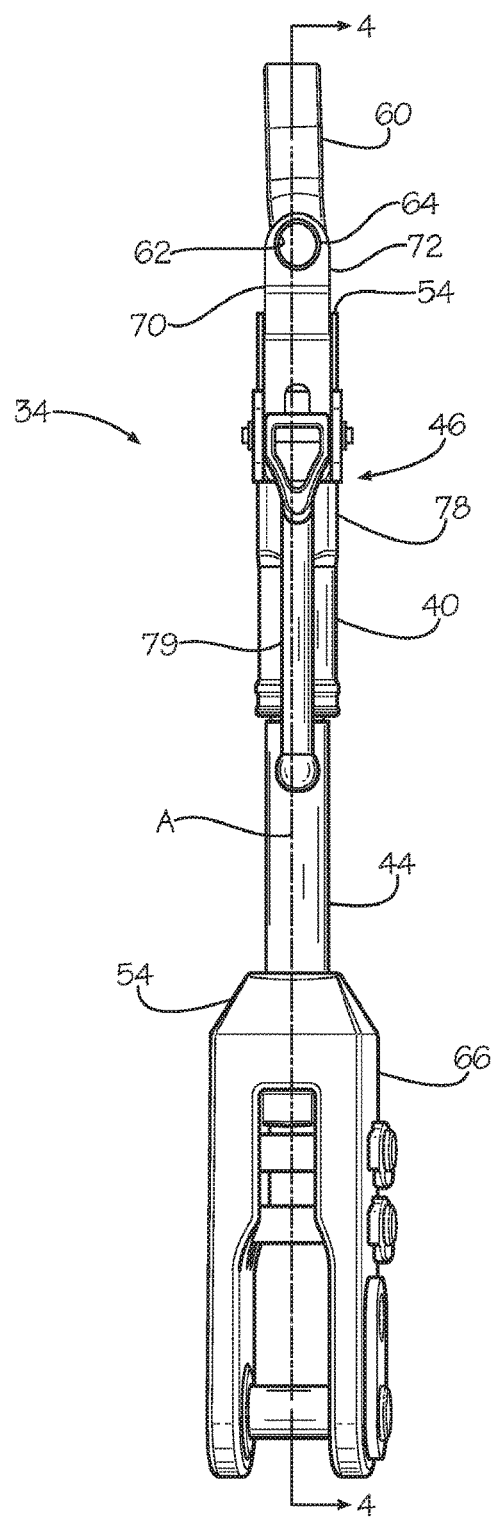
FIG. 3 is a side elevational view of the adjustable link assembly.
Figure 4:
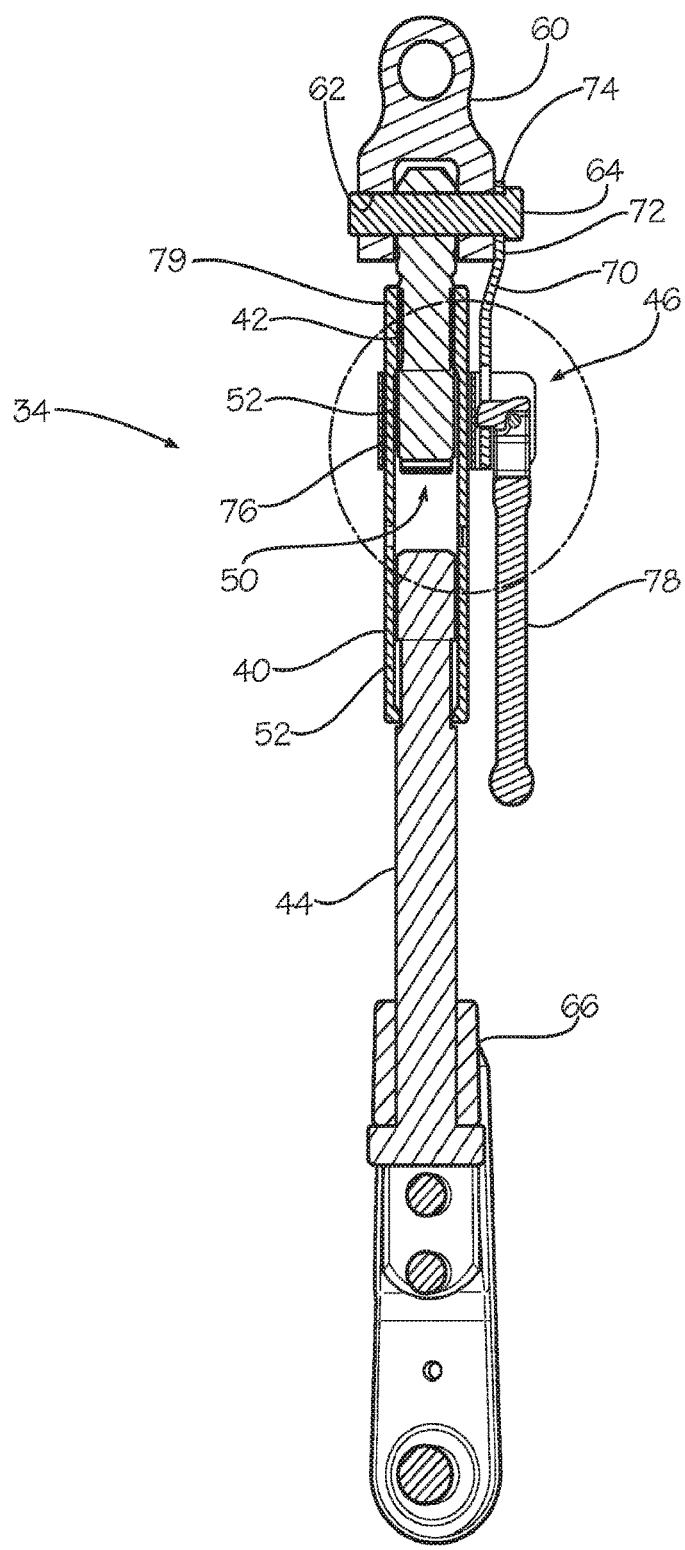
FIG. 4 is a sectional view of an adjustable link assembly, taken along line 4-4 of FIG. 3.

Turning now to FIGS. 2, 3 and 4, link assembly 34 includes a sleeve 40, first and second rods 42, 44, and a locking mechanism 46. Sleeve 40 has a middle portion 48 that is generally cylindrical shape as best seen in FIG. 2. However, it should be understood that other cross-sectional shapes could be used such as square, triangular, octagonal, or rectangular. Desirably, the sleeve 40 is cast, but one skilled in the art will understand that the sleeve 40 may also have certain features described below welded to it. Sleeve 40 has an internally threaded bore 50 (FIG. 4) disposed therein and defines an axis A along its axial length. The first and second rods 42, 44 have externally threaded end portions 52 and distal connection ends 54. The externally threaded end portions 52 of the first and second rods 42, 44 are positioned within the bore 50 and threadingly engage the internally threaded sleeve 40. Having first and second externally threaded rods 42, 44 meshingly engaged with internally threaded sleeve 40 allows the length of the link assembly 34 to be altered by rotating the sleeve 40 relative to the first and second rods 42, 44. It should be understood that the adjustable link assembly 34 is increased in length by separating the first and second threaded rods 42, 44 when the sleeve 40 is rotated in a first direction and retracted in length when the sleeve 40 is rotated in a second direction.

In the illustrated embodiment, the connection end 54 of the first threaded rod 42 is received by a pivoting tab 60 connected to the rocker arm 16. The connection end 54 has a bore 62 configured to receive a cross pin 64 which is used to connect the first threaded rod 42 to the tab 60, thereby connecting the link assembly 34 to the rocker arm 16. The connection end 54 of the second threaded rod 44 includes a clevis 66 used to connect the link assembly 34 to the draft arm 20. However, one skilled in the art will understand that other means may be used to connect the link assembly 34 to the rocker and draft arms 16, 20 using sound engineering judgment without departing from the scope of the invention.

According to the invention, the locking mechanism 46 includes a locking plate 70 mounted to the upper portion of the link assembly 34. Desirably, the locking plate 70 is secured to the connection end 54 of the first threaded rod 42. In one embodiment, the locking plate 70 has an upper end 72 forming an eye 74 that is engagable with the cross pin 64 that extends through the connection end 54 of the first threaded rod 42 to secure the locking plate 70 and prevent the locking plate 70 from rotating relative the connection end 54 of the first threaded rod 42 and upper portion of the link assembly 34.

The locking mechanism 46 also has sliding collar 76 with a pivotable locking handle 78. The collar 76 is positioned over the sleeve 40 and is configured to slide relative a portion of the sleeve 40 along axis A. In the illustrated embodiment, the collar 76 has a geometric shape that meshes with an upper portion 79 of the sleeve 40 so as to prevent rotational movement of the upper portion 79 of the sleeve 40 relative the collar 76. However, the middle portion 48 of the sleeve 40 has a different geometric cross section that enables rotational movement of the sleeve 40 relative the collar 76. However, other features formed on the sleeve 40 and the collar 76 could be utilized to prevent rotational movement when the collar 76 is adjacent the upper portion 79 and allow rotational movement when the collar 76 is adjacent the middle portion 48 of the sleeve 40. In the illustrated embodiment, the locking handle 78 is mounted to outwardly extending tabs 80 of the collar 76 with a pivot pin 82.

The locking handle 78 can be pivoted to a locked position as shown in FIG. 2 in which the handle 78 is generally parallel with the axis A of the sleeve 40. In the locked position, the handle 78 and collar 76 engage the locking plate 70 thereby preventing the collar from sliding along axis A relative the sleeve. The locking handle 78 also has a released position generally perpendicular to the axis A in which the handle 78 and collar 76 are disengaged from the locking plate 70. In the released position, the collar 76 may slide downward to the middle portion 48 thereby allowing rotation of the sleeve 40 relative to the locking plate 70.

Figure 5:
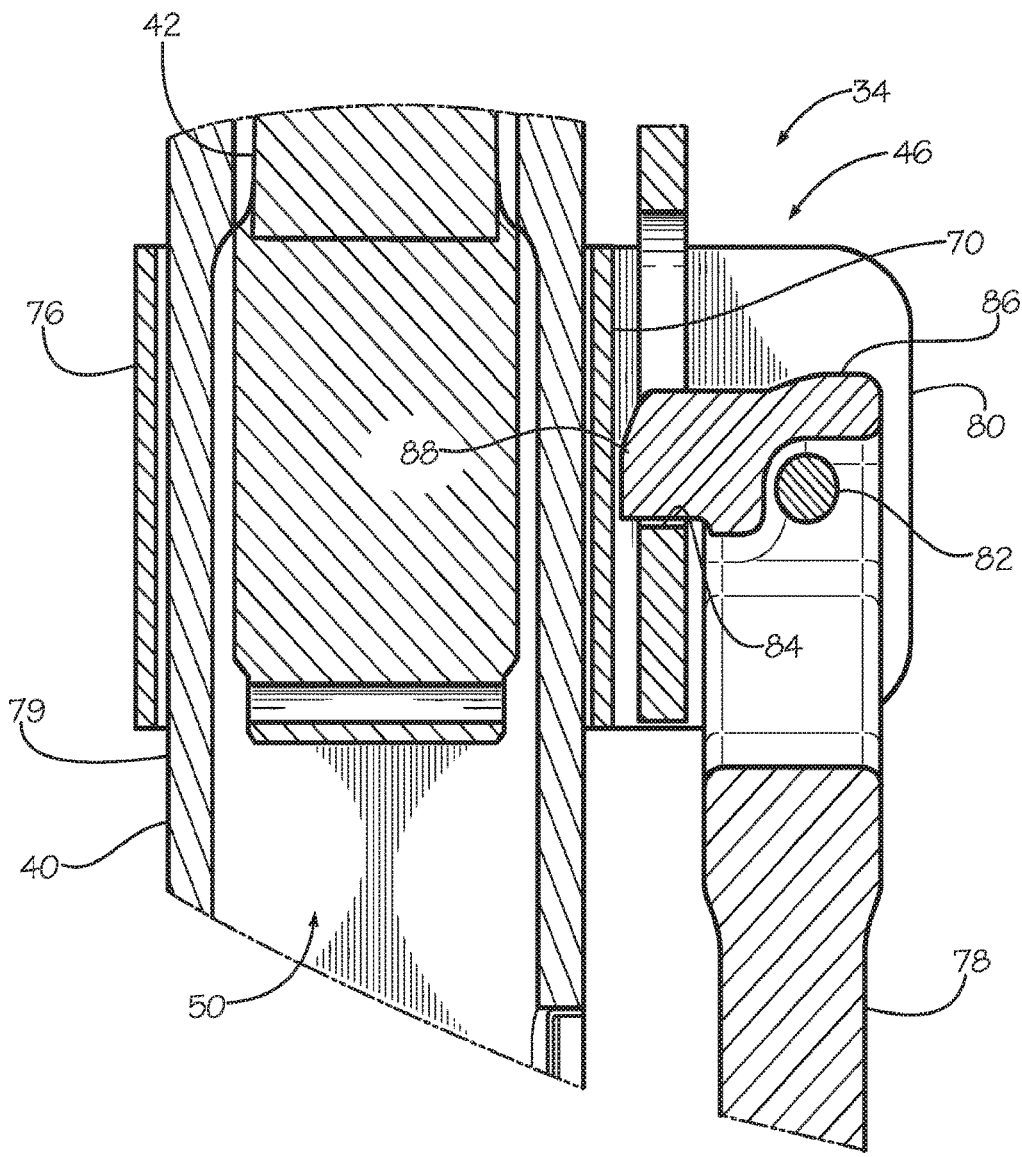
FIG. 5 is an enlarged cross sectional view of a portion of the link assembly shown in FIG. 4.

In the illustrated embodiment, the lower portion of the locking plate 70 has an aperture 84 formed therein. As better seen in the enlarged view of FIG. 5, the locking collar 76 has an engagement portion 86 extending radially inward toward the sleeve 40. The locking handle 78 engages the engagement portion 86 with a cam surface 87 such that pivoting moment of the handle 78 causes inward or outward movement of the engagement portion 86. The inward end of the engagement portion 86 forms a detent 88 that engages the aperture 84 in the locking plate 70 when the handle 78 is in the locked position to prevent sliding of the collar and therefore rotation of the sleeve 40. However, one skilled in the art will understand that the locking mechanism 46 can be designed with other structure such that pivoting motion of the handle 78 causes the locking collar 76 to engage and disengage with the locking plate 70 using sound engineering judgment. For example, the locking plate 70 could have a detent that engages an aperture in a surface controlled by the handle 78 without departing from the scope of the invention. Alternately, the collar 76 could slide over the locking plate 70 to prevent rotation but have a feature on the handle 78 that engages with the sleeve 40 using sound engineering judgment.

To adjust the link assembly 34, the operator lifts the locking handle 78 to the released position. This action disengages the detent 88 from the aperture 84 thereby disengaging the collar 76 from the locking plate 70. The operator can then slide the collar 76 and handle 78 down to the middle portion 48 of the sleeve 40 where the sleeve 40 can rotate relative the collar 76. This allows the operator to turn the sleeve 40 adjusting the overall length of the link assembly 34 as described above. Once the operator is done adjusting the length of the link assembly 34, the collar 76 is slide back up to the upper portion 79 of the sleeve 40 where it engages the locking plate 70. The collar 76 must be lifted up high enough that when the locking handle 78 is lowered to the more vertical locked position, the detent 88 engages into the aperture 84 on the locking plate 70. Once the operator sees that the detent 88 is engaged, the locking handle 78 can be fully lowered to the locked position.

Due to the placement of the detent 88 on the locking handle 78, the weight of the locking handle 78 will push the detent 88 into the aperture 84 in an effort to keep the locking mechanism 46 in the locked condition. Thus, the locking mechanism 46 uses the weight of the locking handle 78 to keep it latched and locked in place. Because the link assembly 34 typically operates in a near vertical position, the weight of the handle 78 will tend to keep the handle 78 in the locked position keeping the detent 88 engaged in the aperture 84 of the locking plate 70. Therefore, an adjustable link assembly 34 is provided that permits flexibility to the operator for making adjustments in the field without the need to remove any loose pins or components that can be lost during operation.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings.

The invention claimed is:

1. A work machine having a coupling arrangement for a towed implement, the coupling arrangement comprising a pair of rocker arms and a pair of draft arms having a pair of link assemblies interposed between and secured to the rocker arms and draft arms, each link assembly comprising:
   a sleeve having an internally threaded bore disposed therein and defining an axis A along its axial length;
   first and second rods, the first and second rods having externally threaded end portions and distal connection ends, the externally threaded end portions of the first and second rods being positioned within the bore to threadingly engage the internally threaded sleeve to permit a length of the link assembly to be altered by rotating the sleeve relative to the first and second rods; and
   a locking mechanism, the locking mechanism comprising:
      a locking plate mounted on the link assembly such that the locking plate is prevented from rotating relative an upper portion of the link assembly;
      a collar positioned over the sleeve and configured to slide relative the sleeve along axis A between an upper portion of the sleeve and a middle portion of the sleeve, and wherein the collar meshes with the upper portion so as to prevent rotational movement of the sleeve relative the collar when the collar is adjacent the upper portion, and wherein the sleeve is able to rotate relative the collar when the collar is adjacent the middle portion of the sleeve; and
      a locking handle mounted on the collar and pivotable between a locked position in which the handle is generally parallel with the axis A of the sleeve in which the and collar is prevented from sliding along axis A relative the sleeve, and a released position generally perpendicular to the axis A in which the collar is able to slide relative the sleeve along axis A.

2. The work vehicle of claim 1 wherein the locking plate has an aperture formed therein and the locking collar has an engagement portion extending radially inward toward the sleeve with a detent on its inward end and the locking handle engages the engagement portion such that pivoting moment of the handle causes inward or outward movement of the engagement portion to engage and disengage the detent from the aperture.

3. The work machine of claim 1 wherein the locking plate is secured to a connection end of the first threaded rod, wherein the locking plate has an upper end forming an eye that is engagable with a cross pin that secures the connection end of the first threaded rod to the rocker arm to prevent the locking plate from rotating relative the sleeve.

4. The work machine of claim 1 wherein the collar has a geometric shape that meshes with the upper portion of the sleeve so as to prevent rotational movement of the upper portion of the sleeve relative the collar and the middle portion of the sleeve has a different geometric cross section that enables rotational movement of the sleeve relative the collar.

\* \* \* \* \*